April 14, 1953 H. A. FLYNN 2,634,627
AUTOMATIC POWER TRANSMISSION MECHANISM
Filed July 30, 1949 4 Sheets-Sheet 4

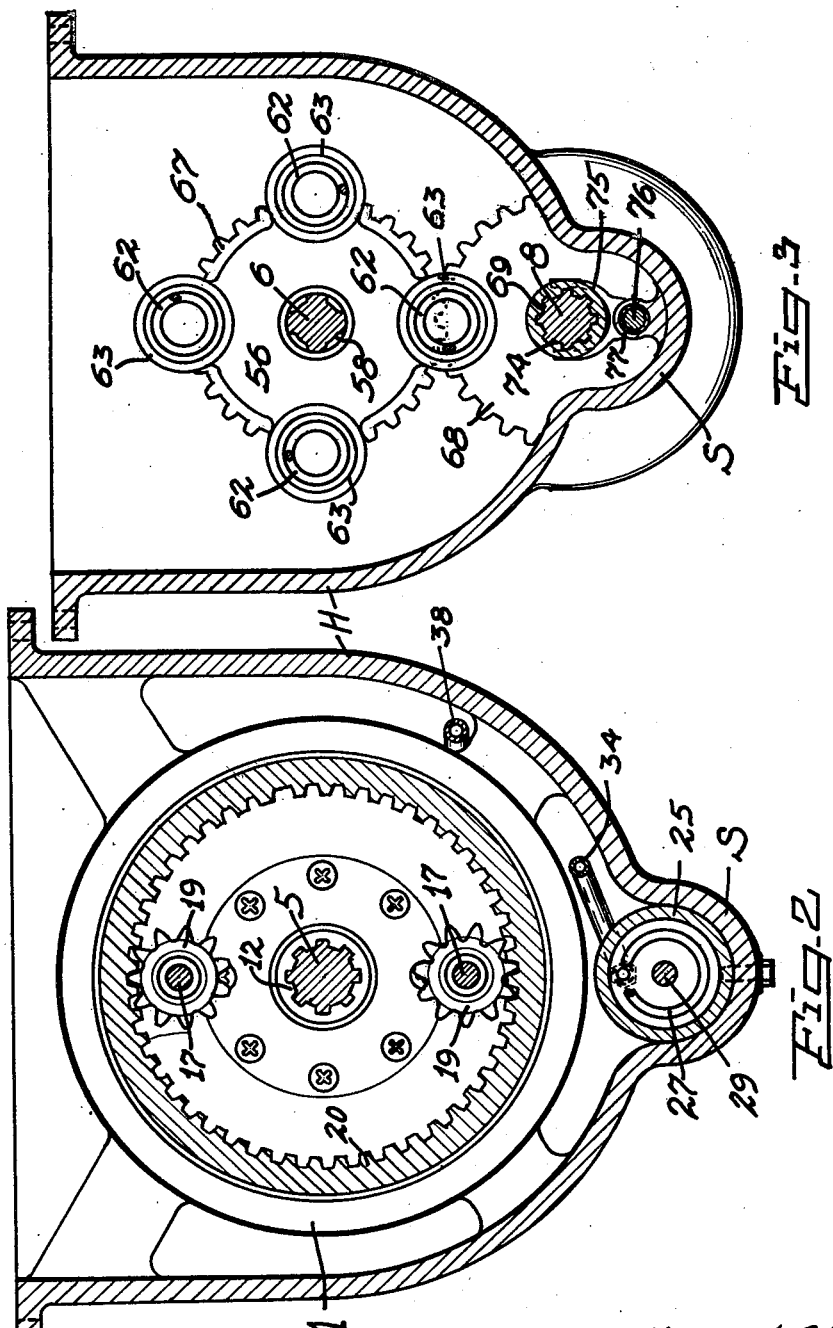

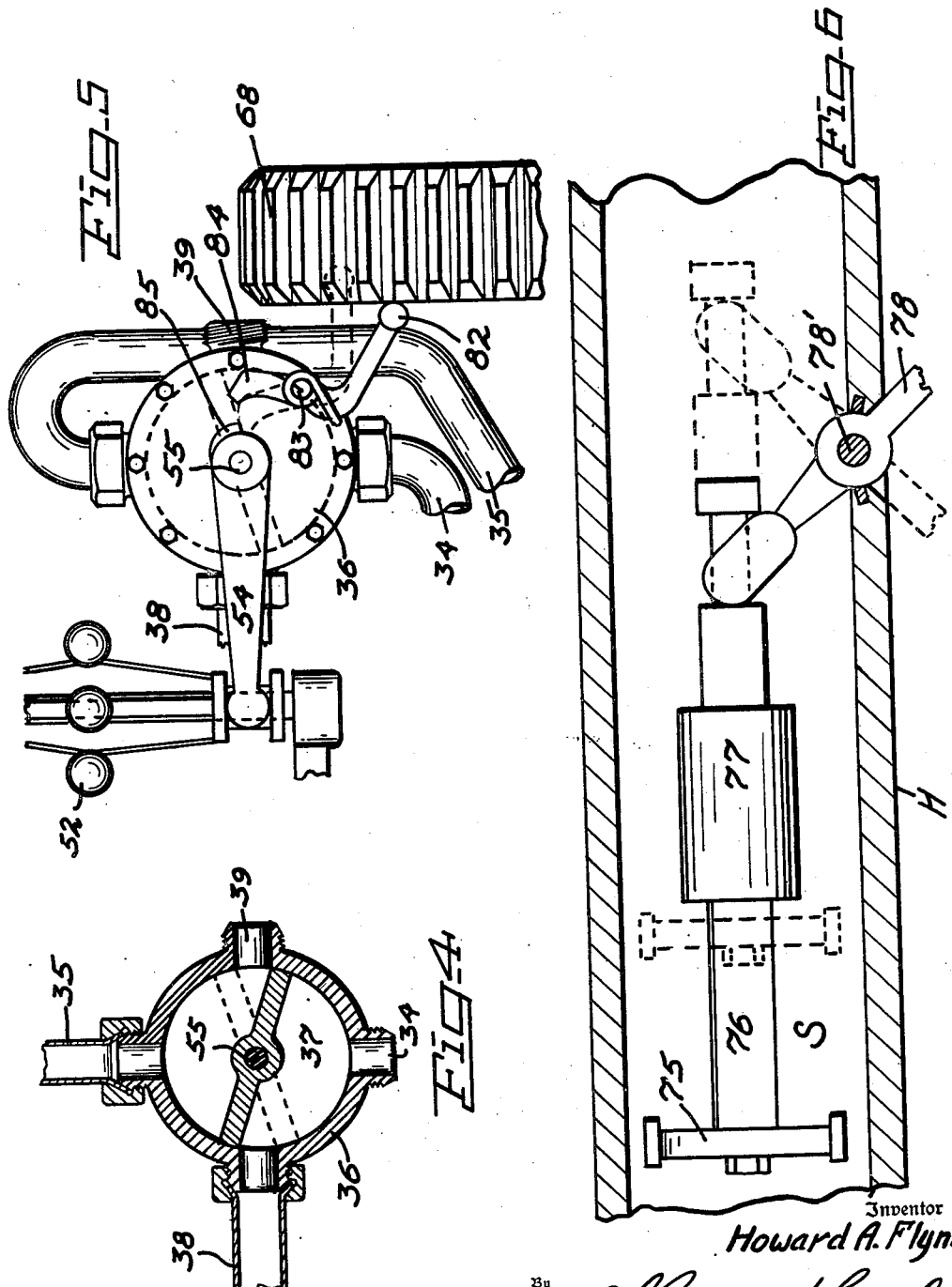

INVENTOR.
Howard A. Flynn
BY
Glenn L. Fish
attorney

Patented Apr. 14, 1953

2,634,627

UNITED STATES PATENT OFFICE 2,634,627

AUTOMATIC POWER TRANSMISSION MECHANISM

Howard A. Flynn, Spokane, Wash.

Application July 30, 1949, Serial No. 107,807

3 Claims. (Cl. 74—751)

1

The present invention relates to the general class of automotive vehicles, and more specifically to an improved automatic power transmission mechanism for motor vehicles having a fluid pressure control system responsive to the speed of a motor shaft and the degree of torque of an axially alined sectional power transmitting shaft, for high, low, and reverse speeds of the propulsion shaft of a vehicle, or for the power output shaft of a stationary power plant. In carrying out my invention the sectional power shaft is equipped with a pair of spaced change speed couplings of the epicyclic gearing type, one of which is controlled and speed is regulated in response to the speed of the motor shaft by a fluid pressure operated servomotor and controlling valves regulated by shaft-operated governors.

The second and resiliently mounted coupling unit of the epicyclic type is automatically controlled by and responsive to the speed of an intermediate driven shaft and its torque, and the intermediate shaft is equipped to control and drive the reversing gearing or trains to the propulsion shaft or power output shaft, under manually operated means.

The invention consists in certain novel features of construction and combinations and arrangements of these parts as will hereinafter be described and more particularly set forth in the appended claims.

In the accompanying drawings I have illustrated a complete example of a physical embodiment of my invention in which the parts are combined and arranged in accord with one mode I have devised for the practical application of the principles of the invention in a transmission mechanism for a motor vehicle. It will however be understood that changes and alterations are contemplated and may be made in these exemplifying drawings and mechanical structures, within the scope of my claims, without departing from the principles of the invention.

Figure 1 is a longitudinal vertical sectional view, with some parts in elevation, of the mechanism.

Figures 2 and 3 are respectively transverse vertical sectional views at lines 2—2 and 3—3 of Fig. 1.

Figure 4 is a sectional view of one of the hydraulic control valves.

Figure 5 is a view in elevation of one of the control valves with its centrifugal ball governor; and Figure 6 is an enlarged horizontal sectional view at line 6—6 of Fig. 1 showing the manually operated bolt and lever mechanism for the reversing gearing.

2

Figure 7:
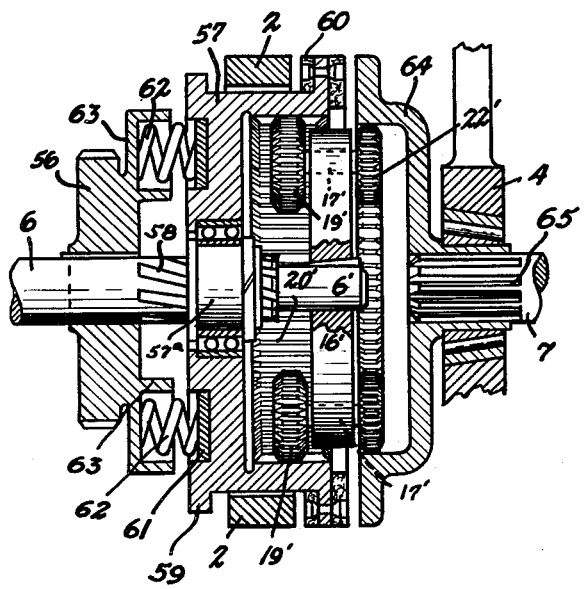

Figure 7 is a fragmentary vertical section of the torque responsive transmission.

Figure 1:
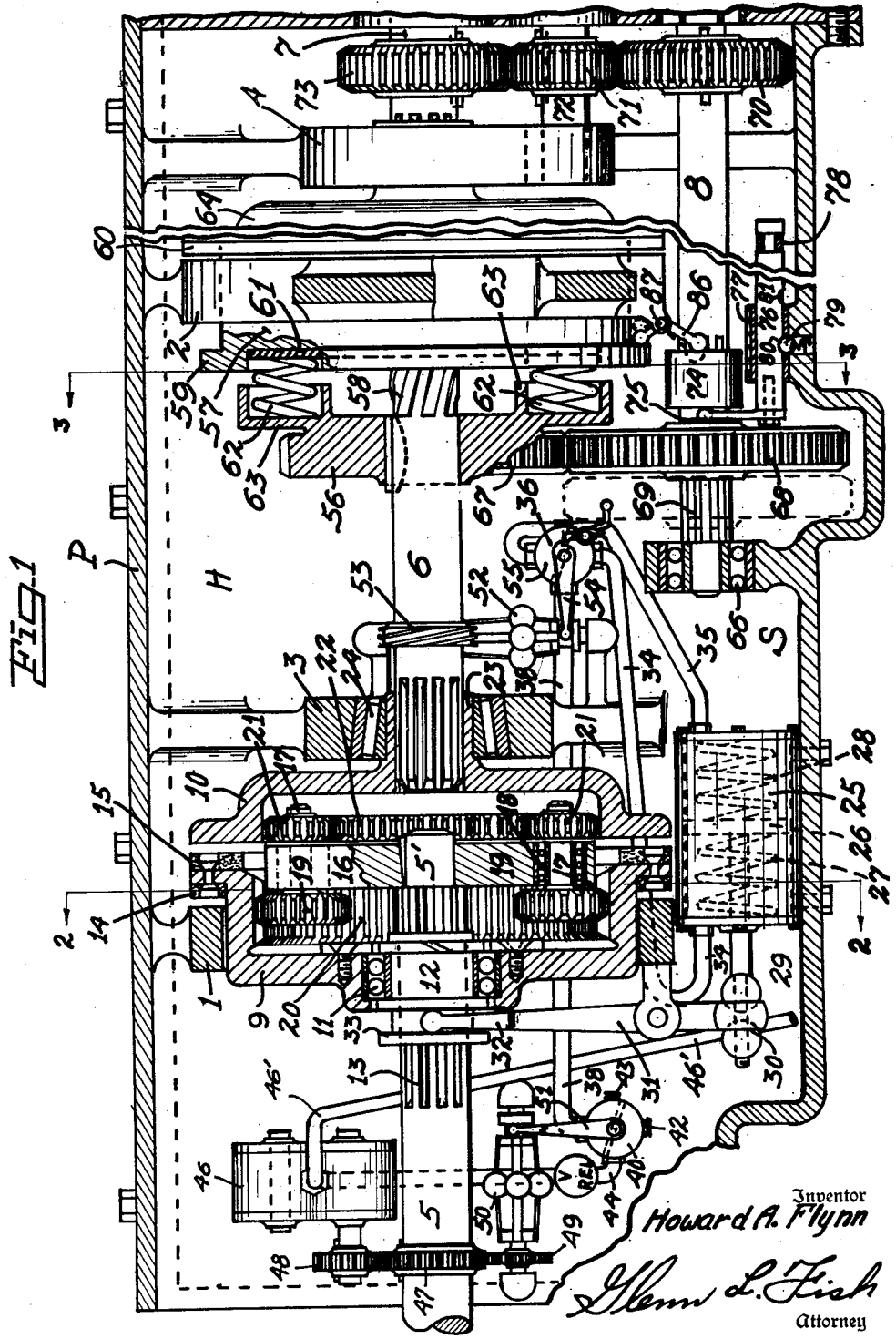

In Fig. 1 the power transmission gearing is enclosed within a housing H that extends longitudinally of the automotive vehicle and closed by end plates and a bolted cover plate P, the lower portion of the housing being provided with a sump as S for oil of the fluid pressure control system of the gearing. For supporting the transmission gearing the housing is provided with transversely arranged and vertically extended bearing rings 1 and 2 that form stationary brake bands, and bearing rings 3 and 4, integral with and braced from the sides of the housing.

At the left end of Fig. 1 the power shaft or drive shaft 5 is driven from the motor of the vehicle and equipped with a usual fly-wheel not shown, an intermediate driven shaft 6 is axially alined with the drive shaft, the power output shaft or propulsion shaft 7 for transmitting power to the vehicle wheels is axially alined with shafts 5 and 6, and a spaced parallel countershaft 8 is provided for reversing the drive to the propulsion shaft.

For transmitting power from the drive shaft 5 to the driven shaft 6 a gear coupling unit of the epicyclic type is employed including the impeller or flanged housing 9 that is longitudinally shiftable on the drive shaft within the bearing ring 1 and a flanged rotor or driven housing 10 rigid and rotatable with the driven or intermediate shaft 6.

The impeller or clutch housing 9, which has a slide bearing in the stationary ring 1, is mounted by its central hub upon a ball bearing 11 surrounding a clutch sleeve 12 that is splined at 13 to rotate with and slide on the drive shaft 5, and the flanged impeller 9 is equipped with oppositely arranged friction brake rings or clutch rings 14 and 15, the former for coaction with the stationary bearing ring or brake ring 1, and the latter located for frictional engagement with the flanged housing or member 10.

The projecting end 5' of the drive shaft 5 has keyed thereto a driving cross-head 16 in which are journaled two diametrically arranged shafts 17 mounted in bearings 18 of the head, and each shaft at one end is equipped with a pinion 19 that meshes with an internal gear ring 20 rigid with the driving housing 9.

These stud shafts 17 are also equipped with a second pair of pinions 21 meshing with an internal gear ring 22 rigid with the interior of the driven housing 10, and the housing is splined at 23 on the shaft 6 which is supported in thrust roller bearings 24 of the fixed bearing ring 3.

The impeller 9 is shiftable longitudinally of shaft 5 under action of a hydraulic or fluid pressure operated servomotor located within the sump S of the housing and bolted in place, which motor includes a cylinder 25, a piston 26 located between spaced springs 27 and 28, and the piston rod or plunger 29. The outer end of the plunger is flexibly coupled by a ball and socket joint 30 to the lower arm of a lever 31 having an end yoke 32 engaged around the clutch spool 33 of the slide sleeve 12.

For activating the servo-motor, hydraulic or fluid pressure is admitted through opposite ends of the cylinder by pipes 34 and 35 which connect the motor with the casing 36 of a rotary valve 37.

With the shaft 5 rotating, and when fluid pressure is applied through pipe 34 to the left end of the servo-motor against the piston 26, the lever 31 is oscillated to shift the impeller 9 to the left to contact its friction ring 14 with the staionary brake ring 1, thereby retaining the impeller housing 9 in non-rotary position. The two pairs of reduced ratio pinions 19 and 21 meshing with the internal gear rings 20 and 22 and rotating with the head 16 drive the driven housing or rotor 10 and its shaft 6 at low speed.

For a higher speed, hydraulic pressure is admitted through pipe 35 to the right end of the servo-motor, thus causing arm or lever 31 to shift the impeller 9 to the right thereby frictionally engaging clutch ring 15 with the fianged housing 10 to lock the coupling members and revolving shaft 6 with the speed of shaft 5, for a direct drive.

The position of the valve 37 and the operation of the servo-motor are controlled responsive to the speed of the drive shaft 5, and the hydraulic pressure is conveyed to the valve casing through supply pipe 38, an exhaust port 39 being provided in the valve casing to relieve pressure in the servo-motor under action of either of the springs 27 or 28.

Supply pipe 38 connects valve 37 with another similar control valve 40 in casing 41 having exhaust ports 42 and 43, and valve 40 is connected by intake pipe 44 and its relief valve 45 to a rotary pump 46 having an intake or suction pipe 46' having its lower end extending into the oil in the sump S of the housing H.

The rotary gear pump is driven from the drive shaft 5 by gear 47 and pinion 48, and a second pinion 49 is driven by gear 47 to operate a speed responsive ball governor 50, which, through the control lever 51, actuates the valve 40.

A second speed responsive ball governor 52 is provided for the valve 37 and regulated by the speed of shaft 6 through a worm-connection 53 between the shaft and governor, and the governor is instrumental in oscillating a lever 54 mounted on the stem 55 of the valve 37.

For a forward drive in the transmission of power from the driven or intermediate shaft 6 to the propulsion shaft 7 the shaft 6 has keyed thereto a geared clutching drive-head 56 for coaction with and longitudinally shifting a coupling housing 57 that fits about the projecting end portion of the shaft which is formed with helical splines 58.

The coupling housing 57 is formed with a pair of spaced annular exterior flanges 59 and 60, which limit its shifting movement within the bearing ring 2, and the left hand face of the housing is grooved to receive and retain a split metallic friction ring or slip ring 61.

For coaction with the slip ring of the impeller housing the driving head 56 is equipped with four circumferentially spaced and diametrically arranged helical springs 62 each mounted in a pocket or cup 63 integral with and projecting from a lateral face of the head. The impeller housing 57 coacts with a driven housing or rotor 64, and the impeller is provided with a sleeve 57a similar to the sleeve 12 of the first coupling unit, and this sleeve coacts with the helical threads 58 of shaft 6. The mechanism for effecting coaction of the impeller housing 57 with the driving head is similar to the corresponding mechanism providing coaction between the impeller 9 and the rotor 10 and consists of gearing including a cross head 16' which is keyed upon the reduced end 6' of the shaft 6 and formed with transverse openings through which are rotatably mounted shafts 17' carrying pinions 19' and 21'. The pinions 19' mesh with an internal gear ring 20' rigid with the housing 57 and the pinions 19' mesh with the internal gear ring rigid with the rotor 64. The rotor or driven housing 64 of the coupling is splined upon output shaft 7 journaled in bearing ring 4 of the housing, and extends outside the end plate.

For a direct drive this second epicyclic coupling 57—64 is resiliently held by the springs 62 and the friction slip ring 61 in engaged or locked position, but when the load increases and maximum power is required with a reduced speed ratio, the engine throttle is opened resulting in a greater torque between shafts 6 and 7. Then the torque of shaft 6 through its helical threads 58 draws the impeller housing 57 to the left in Fig. 1 to frictionally engage flange 60 with the stationary brake ring 2, thereby attaining the predetermined gear reduction between the two sets of epicycle gears and the rotor housing. When the torque decreases and the tension of springs 62 exceeds the torque, the springs force the impeller flange 60 out of engagement with the brake ring 2 as the impeller is shifted to the right.

For reversing the drive to the shaft 7, power is transmitted around the second coupling and through the reversing counter shaft 8, which shaft is journaled in bearings 66 within the lower portion or sump of the housing H, and the driving head 56 is equipped with a peripheral gear ring 67 that meshes with a longitudinally shiftable gear 68 splined at one end of the shaft, as indicated at 69. The other end of the shaft 8 has a gear or reduced pinion 70 meshing with an idler 71 journaled on stud shaft 72 carried by the bearing ring 4, and the idler in turn meshes with pinion 73 on shaft 7.

The reversing gear 68 is manually shifted from full line active position in Fig. 1 to the dotted line position, and for this purpose the gear is splined to shaft 8 by means of its sleeve 74 having an annular exterior groove in which a yoke 75 fits, and the angular yoke is rigidly mounted on one end of a slide bolt 76 mounted in a bearing sleeve 77 rigid with the housing H. A shift lever 78, accessible from the exterior of the housing is pivotally mounted at 78' with its inner arm in operative relation with the slide bolt and the bolt is resiliently held in adjusted position by means of a spring pressed ball detent 79 mounted in a closed socket in the bottom wall of the housing and which alternately coacts with the spaced sockets 80 and 81 of the slide bolt.

When the reversing gearing is active, as in full lines Fig. 1, the first epicyclic coupling is prevented from gearing into high speed by means of a spring latch that coacts with the second hydraulic valve 37. This spring latch 82 is pivoted at 83 on the exterior of the valve casing 36 and its integral pawl or dog 84 frictionally engages a lip or lug 85 of the hub of the valve lever 54. When the gear 68 of the reversing gearing is shifted to inactive and normal position indicated by dotted lines in Fig. 1 and in full lines in Fig. 5, the gear 68 contacts the latch 82, releases the pawl from the lug, and retains the latch in position to permit operation of the control valve 37.

When the reverse gearing is inactive, the outer end of sleeve 74 of gear 68 contacts a bell crank lever 86 that is pivoted at 87 on the brake bearing ring 2 in position to engage the flange 59 of the impeller 57, to shift the impeller against tension of its springs 62 to the left and thus disengage the enclosed epicycle gearing of the coupling which then rotates freely while the power is transmitted through the reverse gearing.

Having thus fully described my invention, what I claim as new and desire to secure by Letters Patent is:

1. In a power transmission mechanism, a driven shaft rotatably mounted, a transmission shaft rotatably mounted in alignment with said driven shaft, a counter shaft rotatably mounted parallel to said shafts, a gear turning with said driven shaft, a gear turning with and slidable along the counter shaft into and out of meshing engagement with the first gear, gears transmitting rotation from the counter shaft to the transmission shaft in a reversed direction when the second gear is in mesh with the first gear, an epicyclic coupling between the driven shaft and the transmission shaft including an impeller housing rotatably mounted about the driven shaft and a rotor rotatably mounted about the transmission shaft, said rotor being keyed to and turning with the transmission shaft and said impeller housing being operably keyed to the driven shaft by keys extending helically about the driven shaft whereby the housing turns with the driven shaft and is shiftable along the driven shaft by action of the helically extending keys in response to variations in speed at which the driven shaft rotates, a slip ring loosely mounted in an annular recess formed in a side face of the impeller housing confronting the first gear, the first gear being formed with circumferentially spaced sockets, and springs fitting into said sockets and engaging said slip ring and urging the impeller housing towards said rotor.

2. The structure of claim 1 wherein the second gear is formed with a hub extending laterally therefrom along the counter shaft, the impeller housing being formed with a circumferentially extending outstanding flange, a bell crank lever pivotally mounted and having ends of its arms abutting the flange of the housing and the hub of the second gear, and manually operated means for shifting the second gear along the counter shaft including a member shiftable longitudinally of the counter shaft and connected with the hub.

3. The structure of claim 1 wherein the second gear is formed with a hub extending laterally therefrom along the counter shaft and formed with a circumferentially extending groove, the impeller housing being formed with a circumferentially extending flange, a bell crank lever pivotally mounted between the impeller housing and the counter shaft and having ends of its arms abutting the flange and the end of the hub, a tubular bearing extending longitudinally of the counter shaft in transversely spaced relation thereto, a rod slidable longitudinally through said bearing, a fork carried by said rod and engaged in the groove of said hub, and a manually operated lever pivotally mounted and engaged with said rod and serving to shift the rod longitudinally when tilted and thereby serve to shift the second gear along the counter shaft into and out of meshing engagement with the first gear.

HOWARD A. FLYNN.

References Cited in the file of this patent

UNITED STATES PATENTS

| Number | Name | Date |
|---|---|---|
| Re. 22,761 | Wemp | May 28, 1946 |
| 1,118,683 | Rindfleisch | Nov. 24, 1914 |
| 1,949,203 | Havill | Feb. 27, 1934 |
| 2,151,724 | Wengel et al. | Mar. 28, 1939 |
| 2,177,872 | Dunn | Oct. 31, 1939 |
| 2,188,246 | Mirone | Jan. 23, 1940 |